(12) United States Patent
Kasuya et al.

(10) Patent No.: US 11,824,687 B2
(45) Date of Patent: Nov. 21, 2023

(54) INFORMATION PROCESSING APPARATUS AND LEGITIMATE COMMUNICATION DETERMINATION METHOD

(71) Applicant: Hitachi, Ltd., Tokyo (JP)

(72) Inventors: Momoka Kasuya, Tokyo (JP); Nobuyoshi Morita, Tokyo (JP); Kota Ideguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 17/620,634

(22) PCT Filed: Jul. 20, 2020

(86) PCT No.: PCT/JP2020/028167
§ 371 (c)(1),
(2) Date: Dec. 17, 2021

(87) PCT Pub. No.: WO2021/024786
PCT Pub. Date: Feb. 11, 2021

(65) Prior Publication Data
US 2022/0360471 A1 Nov. 10, 2022

(30) Foreign Application Priority Data

Aug. 7, 2019 (JP) ................................. 2019-145610

(51) Int. Cl.
*H04L 12/66* (2006.01)
*H04L 9/40* (2022.01)

(52) U.S. Cl.
CPC ............ *H04L 12/66* (2013.01); *H04L 63/108* (2013.01); *H04L 63/1425* (2013.01)

(58) Field of Classification Search
CPC .................. H04L 2012/40215; H04L 63/1425
See application file for complete search history.

(56) References Cited

U.S. PATENT DOCUMENTS 10,218,499 B1* 2/2019 El Idrissi ................ G06F 21/44
10,291,583 B2* 5/2019 Yan ...................... H04L 63/0227
(Continued)

FOREIGN PATENT DOCUMENTS

| JP | 2016134913 A | 7/2016 |
|----|--------------|--------|
| JP | 2018088616 A | 6/2018 |

(Continued)

*Primary Examiner* — Douglas B Blair
(74) *Attorney, Agent, or Firm* — Procopio, Cory, Hargreaves & Savitch LLP (57) ABSTRACT

An information processing apparatus capable of aperiodic communication and periodic communication, provided with a communication determination unit that determines a type of a communication message; a first processing determination unit that determines relatedness between aperiodic communication and periodic communication by using a first communication message for which the type is determined to be aperiodic communication, and a prediction range for an amount of time for receiving a second communication message for which the type is determined to be periodic communication; and a second processing determination unit that determines that the second communication message is legitimate communication for periodic communication in a case where the periodic communication second communication message determined to have relatedness is in the prediction range a predetermined amount of time later.

8 Claims, 6 Drawing Sheets

(56) References Cited

U.S. PATENT DOCUMENTS

| | | | |
|---|---|---|---|
| 11,314,907 B2* | 4/2022 | Phatak | G06F 9/5027 |
| 2016/0323287 A1 | 11/2016 | Kishikawa et al. | |
| 2018/0048663 A1* | 2/2018 | Yura | H04L 63/1408 |
| 2018/0152464 A1 | 5/2018 | Yajima et al. | |
| 2019/0007427 A1 | 1/2019 | Yajima et al. | |
| 2020/0014758 A1 | 1/2020 | Kamiguchi et al. | |
| 2020/0067955 A1* | 2/2020 | Hass | H04L 12/4625 |

FOREIGN PATENT DOCUMENTS

| | | |
|---|---|---|
| JP | 2019012899 A | 1/2019 |
| WO | 2018173732 A1 | 9/2018 |

* cited by examiner

| CAN ID | APERIODIC COMMUNICATION DETECTION FLAG | ABNORMALITY-TIME PROCESSING FLAG |
|---|---|---|
| 0x01 | 1(0x05) | 1 |
| 0x03 | 1(0x05) | 0 |
| ... | ... | ... |

FIG.7A

| CAN ID | MINIMUM ALLOWED AMOUNT OF TIME (sec) | MAXIMUM ALLOWED AMOUNT OF TIME (sec) | PERIOD (sec) | ADDED AMOUNT OF TIME (sec) |
|---|---|---|---|---|
| 0x01 | 9.86 | 9.88 | 0.10 | 0.01 |
| 0x03 | 10.11 | 10.13 | 0.50 | 0.05 |
| ... | ... | ... | ... | ... |

FIG.7B

| CAN ID | MINIMUM ALLOWED AMOUNT OF TIME (sec) | MAXIMUM ALLOWED AMOUNT OF TIME (sec) | PERIOD (sec) | ADDED AMOUNT OF TIME (sec) |
|---|---|---|---|---|
| 0x01 | 9.86 | 9.88 | 0.10 | 0.01 |
| 0x03 | 10.16 | 10.18 | 0.50 | 0.05 |
| ... | ... | ... | ... | ... |

FIG. 8

INFORMATION PROCESSING APPARATUS AND LEGITIMATE COMMUNICATION DETERMINATION METHOD

TECHNICAL FIELD

The present invention relates to an information processing apparatus and a legitimate communication determination method.

BACKGROUND ART

An automobile is controlled by communication messages being transmitted and received between ECUs (Electronic Control Units) via an in-vehicle network which uses an in-vehicle communication protocol such as CAN (Controller Area Network) or FlexRay (registered trademark). From among in-vehicle communication protocols, for example CAN has a feature that a communication message is transmitted to all ECUs connected to a communication bus, and most communication messages transmitted from an ECU are transmitted at a periodic interval which is determined in advance.

Recently, although user convenience has improved due to a connection between an in-vehicle network and an external network (for example, the Internet, Wi-Fi (registered trademark), or a sensor), the possibility of an unauthorized operation due to an ECU being taken over according to an attack from outside the vehicle has been pointed out. As one method of detecting such an attack, there is a detection method that uses the feature that an ECU periodically transmits communication messages.

For example, in Patent Document 1, a reception unit receives a message periodically transmitted from a communication apparatus on a network, a prediction unit predicts on the basis of a message transmission period the number of messages that the reception unit will receive within a predetermined monitor period, a counting unit counts the number of messages received by the reception unit within the monitor period, and a detection unit detects an attack on the network on the basis of a result of comparing a predicted value obtained by the prediction unit and a count value obtained by the counting unit.

PRIOR ART DOCUMENT

Patent Document

Patent Document 1: JP-2019-12899-A

SUMMARY OF INVENTION

Problem to be Solved by the Invention

Even with communication messages which are outputted periodically as with CAN, there are cases in which messages cannot be transmitted or received periodically due to collisions or disappearance of communication. In this case, even with legitimate communication, the greater that the actual reception time differs from the estimated arrival time, the higher the possibility that the communication will be misdetected as an attack. In the future, as the delay for communication messages decreases due to improved accuracy of techniques for predicting periodic communication or improvements in performance for in-vehicle networks, it is estimated that such misdetections will decrease. In other words, it is estimated that the accuracy of detecting an attack will improve because the accuracy of predicting periodic communication will improve.

In contrast, from now on it is forecast that, as the connectedness of automobiles progresses, there will be an increase in aperiodic event type communication such as OTA (Over the Air) which is a technique for updating firmware via wireless communication. Many apparatuses capable of communication such as ECUs or GWs (Gateways) are connected to an existing communication bus. Since the usage rate of the communication buses is high, there is the possibility that in the future there will be many delays of periodic communication accompanying the increase in aperiodic communication. In other words, even if the accuracy of detecting attacks in periodic communication improves, there is the possibility that legitimate communication will be misdetected due to the increase in aperiodic communication.

Patent Document 1 does not touch upon this point which is that misdetection accompanies delays of periodic communication due to aperiodic communication as described above. In addition, in Patent Document 1, since an attack is detected by comparing the predicted number of received communication messages and the number of communication messages actually received, in the case where deviation arises in the number of messages counted for some kind of reason and being legitimate communication cannot be correctly determined, there still remains the possibility of misdetection as an attack. Accordingly, instead of simply counting the number of communication messages, it is necessary establish a technique that focuses on the relatedness between communications, in particularly the relatedness between periodic communication and aperiodic communication, and correctly determines that a delayed communication message is legitimate communication for periodic communication.

An objective of one aspect of the present invention is to provide a technique for correctly determining that a delayed communication message is legitimate communication for periodic communication.

Means for Solving the Problem

An information processing apparatus according to one aspect of the present invention is configured as an information processing apparatus capable of aperiodic communication and periodic communication, provided with a communication determination unit that determines a type of a communication message; a first processing determination unit that determines relatedness between aperiodic communication and periodic communication by using a first communication message for which the type is determined to be aperiodic communication, and a prediction range for an amount of time for receiving a second communication message for which the type is determined to be periodic communication; and a second processing determination unit that determines that the second communication message is legitimate communication for periodic communication in a case where the periodic communication second communication message determined to have relatedness is in the prediction range a predetermined amount of time later.

Details of at least one implementation of subject matter disclosed in the present specification are set forth in the attached drawings and the following description. Other features, aspects, and effects of the disclosed subject matter will be apparent from the following disclosure, drawings, and claims.

Advantages of the Invention

By virtue of one aspect of the present invention, it is possible to correctly determine that a delayed communication message is legitimate communication for periodic communication.

DESCRIPTION OF EMBODIMENTS

Embodiments of the present invention are described below with reference to the drawings. The following description and the drawings are examples for describing the present invention, and are omitted and simplified, as appropriate, in order to clarify the description. The present invention can be implemented in various other forms. Unless otherwise specified, components may be singular or plural.

In order to facilitate understanding of the invention, there are cases where the position, size, shape, range, etc. of components illustrated in the drawings do not represent actual positions, sizes, shapes, ranges, etc. Accordingly, the present invention is not necessarily limited to the positions, sizes, shapes, ranges, etc. set forth in the drawings.

In the following description, various items of information may be described by expressions such as "table" and "list," but the various items of information may be expressed as data structures different to these. To indicate independence from a data structure, "xx table," "xx list," etc. may be referred to as "xx information." When describing identification information, in a case where expressions such as "identification information," "identifier," "name," "ID," and "number" are used, these can be mutually interchanged.

In the case where there is a plurality of components having the same or similar functionality, there are cases where description is essentially given after applying different suffixes to the same reference symbol. However, in the case where there is no need to distinguish between this plurality of components, description omitting the suffix may be given.

In addition, in the following description, processing performed by executing a program may be described, but since the program is executed by a processor (for example, a CPU (Central Processing Unit) or a GPU (Graphics Processing Unit)) to perform defined processing while appropriately using a storage resource (for example, a memory) and/or an interface device (for example, a communication port) or the like, the processor may be given as the performer of the processing. Similarly, the performer of processing performed by executing a program may be a controller, an apparatus, a system, a computer, or a node that each have a processor. The performer of processing performed by executing a program may be a calculation unit, or may include a dedicated circuit (for example, a FPGA (Field-Programmable Gate Array) or an ASIC (Application-Specific Integrated Circuit)) which performs specific processing.

A program may be installed to an apparatus such as a computer from program source. Program source may be storage media that can be read by a program distribution server or a computer, for example. In the case where program source is on a program distribution server, it may be that the program distribution server includes a processor and a storage resource which stores a program to be distributed, and the processor in the program distribution server distributes the program to be distributed to another computer. In addition, in the following description, two or more programs may be realized as one program, and one program may be realized as two or more programs.

Below, in an in-vehicle system to which is connected a plurality of information processing apparatuses (for example, information processing apparatuses that are capable of communication and detect an abnormality in an electronic control unit of the in-vehicle system), a certain information processing apparatus determines the status of communication transmitted from another information processing apparatus, for example the presence or absence of aperiodic communication and the relatedness between aperiodic communication and periodic communication. It is considered that delay of a communication message in accordance with periodic communication (a second communication message) occurs in the first periodic communication communication message received after a communication message in accordance with aperiodic communication (a first communication message). A determination of being legitimate communication is made for the abovementioned first periodic communication communication message for which having the abovementioned relatedness has been determined. Even in the case where the abovementioned first communication message is delayed, as described below, a prediction range for the reception amount of time for the abovementioned first communication message is corrected, the determination for being legitimate communication is made again, and the delayed periodic communication is determined to be legitimate communication. Description is given below in detail regarding an information processing apparatus and a legitimate communication determination method according to the present embodiment, but there is no limitation to this example. For example, application can be made to various information processing apparatuses in environments which mix periodic communication and aperiodic communication, such as an IT (Information Technology) system or a control system for something other than an in-vehicle system.

Figure 1:
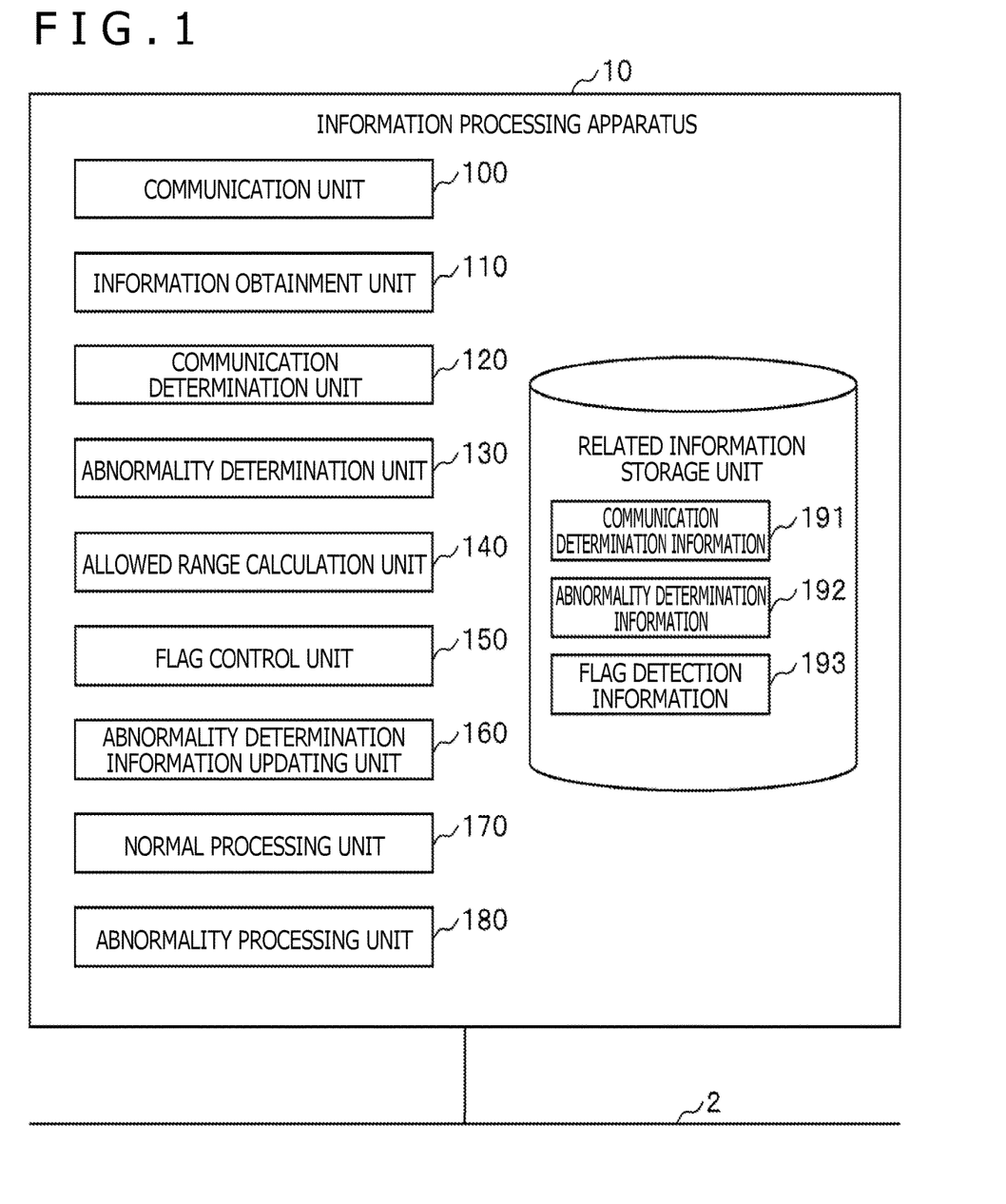
FIG. 1 is a block view illustrating an example of a functional configuration of an information processing apparatus according to the present embodiment.

FIG. 1 is a block view illustrating an example of a functional configuration of an information processing apparatus according to the present embodiment. As illustrated in FIG. 1, an information processing apparatus 10 is provided with a communication unit 100, an information obtainment unit 110, a communication determination unit 120, an abnormality determination unit 130, an allowed range calculation unit 140, a flag control unit 150, an abnormality determination information updating unit 160, a normal processing unit 170, an abnormality processing unit 180, and a related information storage unit 190. The related information storage unit 190 is configured from a storage medium such as a typical memory (for example, a RAM (Random-Access Memory)) as hardware, and stores communication determination information 191, abnormality determination information 192, and flag detection information 193. The information processing apparatus 10 is connected to another information processing apparatus via a communication bus 2.

Here, before describing each function configuration of the information processing apparatus 10, description is given in relation to envisioned connections to the information processing apparatus.

The information processing apparatus 10 is one of a plurality of information processing apparatuses inside a vehicle, and represents a typical ECU or GW as hardware, for example. Inside the vehicle, a bus type or star type communication system is constructed using the plurality of information processing apparatuses. As a standard for the communication bus 2, for example it is possible to use various standards for performing periodic communication such as CAN, FlexRay, LIN (Local Interconnect Network), or Ethernet. However, description is given below assuming that CAN is used for the communication bus 2 as an example.

In addition, functionality of each of the abovementioned units that the information processing apparatus 10 has is realized by, for example, the CPU of an ECU reading out a program from a ROM (Read Only Memory) and executing processing by performing reading and writing with respect to a RAM. The abovementioned program may be provided by, for example, being read out from a storage medium such as a USB (Universal Serial Bus) memory, or downloaded from another computer (for example, a server or cloud which manage the ECU) via a network.

Description is given from here regarding functions of the information processing apparatus 10 illustrated in FIG. 1. However, some of the functions described below may be provided in an out-of-vehicle system such as an SOC (Security Operation Center), or in another in-vehicle device.

The communication unit 100, via the communication bus 2, receives a communication message transmitted from another information processing apparatus 10, or transmits a result of processing by the information processing apparatus 10 to another information processing apparatus 10.

The information obtainment unit 110 reads identification information (a CAN ID) from a communication message received by the communication unit 100. On the basis of the read CAN ID, the information obtainment unit 110 calculates a reception amount of time for the received communication message. Regarding communication messages with the same CAN ID, the reception amount of time is the interval between the reception time of a communication message received at a certain timing, and the reception time of a communication message received at a timing therebefore. For the method of calculating the reception amount of time, it is possible to use, for example, a method that uses a timer held by the information processing apparatus 10, a clock used by the information processing apparatus 10, or a time stamp added to a communication message. Note that, although the interval between reception times is used as the reception amount of time below, it is sufficient if it is possible to detect that communication messages have been received at certain timings, and, in this case, it is possible to set the interval between these detected timings as the reception amount of time.

The communication determination unit 120 determines a communication type on the basis of the CAN ID read by the information obtainment unit 110. In order to determine the communication type, the communication determination unit 120 uses the communication determination information 191 (FIG. 5), which is a table stored by the related information storage unit 190.

Figure 5:
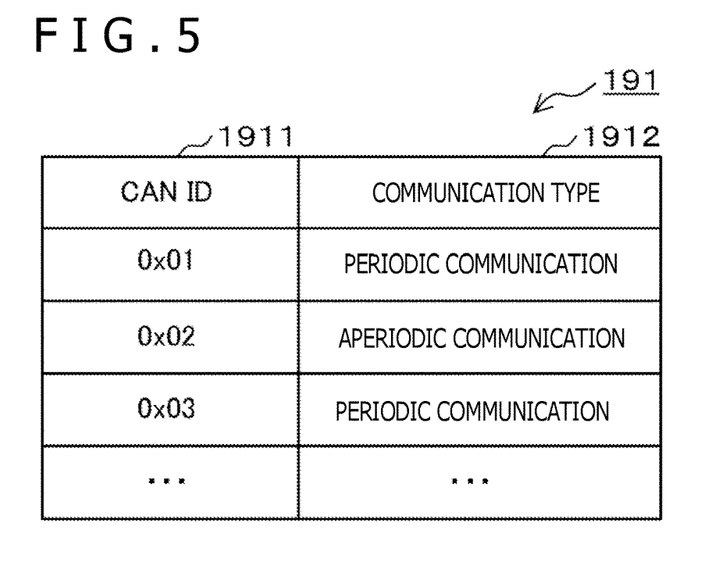
FIG. 5 illustrates an example of communication determination information.

FIG. 5 illustrates an example of the communication determination information 191. The communication determination information 191 defines a communication type for each CAN ID. The communication type is classified into, for example, periodic communication and aperiodic communication. FIG. 5 indicates that communication identified by a CAN ID of "0x01," for example, is periodic communication.

In addition, in a case of determining that the communication type of the received communication message is aperiodic communication, the communication determination unit 120 instructs the flag control unit 150 to record, in the flag detection information 193 (FIG. 6) which is a table stored in the related information storage unit 190, an aperiodic communication detection flag 1932 indicating that an aperiodic communication communication message has been received.

Figure 6:
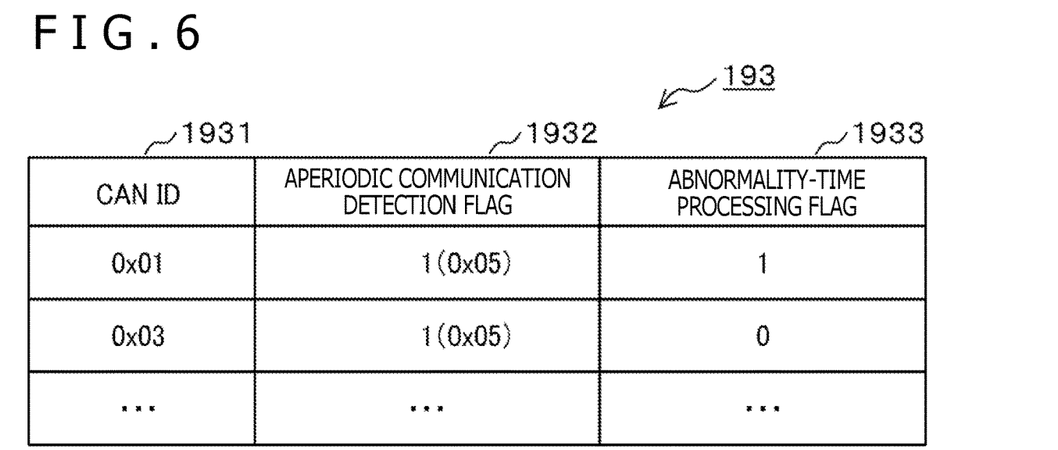
FIG. 6 illustrates an example of flag detection information.

FIG. 6 illustrates an example of the flag detection information 193. The flag detection information 193 is information used for determining the relatedness of aperiodic communication and periodic communication. For each periodic communication CAN ID, the flag detection information 193 stores in association an aperiodic communication detection flag and an abnormality-time processing flag. FIG. 6 illustrates that, for periodic communication identified by a CAN ID of "0x01," for example, the aperiodic communication detection flag 1932 and an abnormality-time processing flag 1933 are both set to "1." In addition, an aperiodic communication CAN ID "0x05" is stored in association with the aperiodic communication detection flag 1932, and it is possible to identify an aperiodic communication CAN ID. The aperiodic communication CAN ID "0x05" is similarly stored for communication identified by the CAN ID "0x03."

The abnormality determination unit 130 is a processing unit which performs work in a case where the communication determination unit 120 determines that the communication type of a received communication message is periodic communication. The abnormality determination unit 130 determines whether the reception time of an aperiodic communication communication message, for which the aperiodic communication detection flag 1932 is set, is within a periodic communication reception amount of time prediction range, which is described below. Note that, although the abovementioned determination is performed using the reception time of an aperiodic communication communication message below, it is sufficient if it is possible to detect the reception of an aperiodic communication communication message at a certain timing. In this case, it is sufficient if it is determined whether the aperiodic communication communication message detected at the certain timing is within the abovementioned prediction range.

In a case in which the abnormality determination unit 130 has determined that the reception time of the aperiodic communication communication message, for which the aperiodic communication detection flag 1932 is set, is within a periodic communication reception amount of time prediction range which is described later, the abnormality determination unit 130 determines that the aperiodic communication and the periodic communication have relatedness. Furthermore, the abnormality determination unit 130 determines whether the periodic communication communication message for which having relatedness has been determined is within the abovementioned reception amount of time prediction range. In a case of having determined that the periodic communication communication message for which having relatedness has been determined is within the abovementioned reception amount of time prediction range, the abnormality determination unit 130 determines that the periodic communication communication message is a communication message in accordance with legitimate communication.

In contrast, in a case of having determined that the periodic communication communication message for which having relatedness has been determined is not within the abovementioned reception amount of time prediction range, the abnormality determination unit 130 further determines whether the periodic communication communication message is within a corrected reception amount of time prediction range, which is described later. In a case of determining that the periodic communication communication message is within the corrected reception amount of time prediction range which is described below, the abnormality determination unit 130 determines that the periodic communication communication message is a communication message in accordance with legitimate communication which should originally have been received within the uncorrected prediction range and which has been delayed by the aperiodic communication determined to have relatedness, and determines that the periodic communication communication message is a communication message in accordance with legitimate communication.

In cases other than these, the abnormality determination unit 130 determines that it is possible for the received periodic communication communication message to be an abnormality instead of legitimate communication. Specific processing for this case is described below using FIG. 3.

Figure 7A:
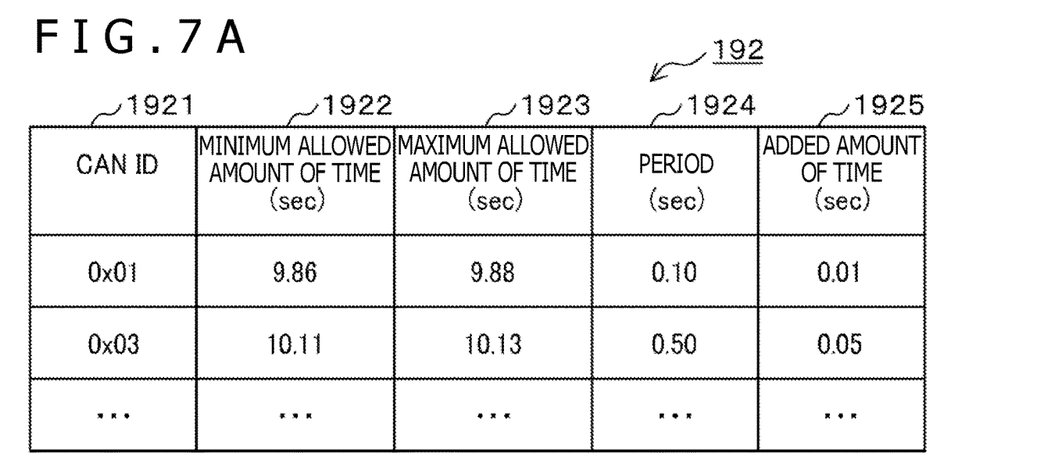
FIG. 7A is a view illustrating an example of abnormality detection information (before correction).
Figure 7B:
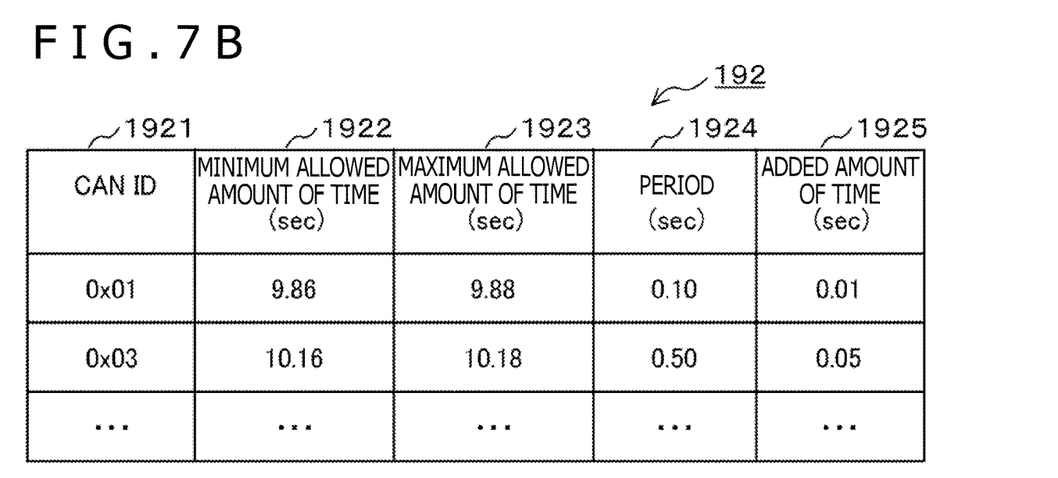
FIG. 7B is a view illustrating an example of abnormality detection information (after correction).

In order to perform these determinations, the abnormality determination unit 130 uses allowed range information stored in the abnormality determination information 192 (FIGS. 7A and 7B) which is a table stored in the related information storage unit 190. The allowed range information indicates a reception amount of time prediction range for determining that a communication message next received after a received communication message is legitimate communication. In FIGS. 7A and 7B, a minimum allowed amount of time 1922 and a maximum allowed amount of time 1923 are defined as the allowed range information, and legitimate communication is determined if the reception amount of time prediction range is between the minimum allowed amount of time 1922 and the maximum allowed amount of time 1923. The prediction range is the amount of time between the minimum allowed amount of time 1922 and the maximum allowed amount of time 1923. For example, FIG. 7A indicates that communication identified by the CAN ID "0x01" is determined to be legitimate communication if the communication is between a minimum value "9.86 seconds" and a maximum value "9.88 seconds" for the reception amount of time which is allowed as the prediction range. In addition, in the case where the reception time for an aperiodic communication communication message for which the aperiodic communication detection flag 1932 is set is within the abovementioned prediction range of the minimum value "9.86 seconds" and the maximum value "9.88 seconds," it is determined that the aperiodic communication (for example, CAN ID "0x05") and the periodic communication (for example, CAN ID "0x01") have relatedness. Note that initial values for the minimum allowed amount of time 1922 and the maximum allowed amount of time 1923 may be, for example, defined in advance by the abnormality determination unit 130 using an amount of time which is a predetermined multiple of a period 1924.

In a case where the abnormality determination unit 130 has determined that there is the abovementioned possibility of an abnormality but as a result determined that there is no abnormality, the allowed range calculation unit 140 corrects the abovementioned reception amount of time prediction range using an added amount of time 1925. In addition, in a case where the abnormality determination unit 130 has determined that a periodic communication communication message is a communication message in accordance with legitimate communication, the allowed range calculation unit 140 uses the period 1924 to calculate the reception amount of time prediction range for a communication message to be received at a next timing.

The flag control unit 150 controls a flag according to an instructed command in a case where it is determined by the communication determination unit 120 that a communication message is aperiodic communication, in a case where a prediction range is corrected in the allowed range calculation unit 140, or in a case of being commanded from a respective unit such as the abnormality determination information updating unit 160, the normal processing unit 170, or the abnormality processing unit 180.

On the basis of the reception amount of time prediction range for the communication message to be received at the next timing which is calculated by the allowed range calculation unit 140, the abnormality determination information updating unit 160 updates the allowed range information stored in the abnormality determination information 192. In addition, on the basis of the reception amount of time prediction range of the communication message which has been corrected by the allowed range calculation unit 140, the abnormality determination information updating unit 160 updates the allowed range information stored in the abnormality determination information 192, and instructs the flag control unit 150 to set the abnormality-time processing flag 1933 of the flag detection information 193. For example, the abnormality determination information updating unit 160 instructs the flag control unit 150 to update the value of the abnormality-time processing flag 1933 from "0" to "1."

In the case where the abnormality determination unit 130 has determined that a periodic communication communication message is a communication message in accordance with legitimate communication, the normal processing unit 170 executes, as normal-time processing, control processing instructed in the received communication message. In addition, the normal processing unit 170 instructs the flag control unit 150 to reset values set to the aperiodic communication detection flag 1932 and the abnormality-time processing flag 1933. For example, in the case where these flags are set to "1," the normal processing unit 170 instructs about these values to be reset from "1" to "0."

In a case where the abnormality determination unit 130 determines that a received periodic communication communication message is an abnormality and is not legitimate communication, the abnormality processing unit 180 performs control processing that is abnormality-time processing. For example, the abnormality processing unit 180 executes control processing for discarding the communication message or outputting an alert. For this control processing, a method of processing may be changed according to whether the allowed range calculation unit 140 has corrected the abovementioned reception amount of time prediction range.

For example, in a case where the abnormality determination unit 130 has determined that a periodic communication communication message is an abnormality in a case where the periodic communication communication message is not within the uncorrected reception amount of time prediction range, the abnormality processing unit 180 discards the communication message. In contrast, in a case where it is determined that a periodic communication communication message is an abnormality in a case where the periodic communication communication message is not within a corrected reception amount of time prediction range, the abnormality processing unit 180 determines that it has still not been possible to receive the periodic communication communication message even after correcting the prediction range. In addition to discarding this communication message, the abnormality processing unit 180 also transmits, via a wireless network, a warning message indicating an alert or abnormality determination status information indicated a status in which having an abnormality has been determined to an external system (for example, a server or cloud which supervises the in-vehicle system) which manages the information processing apparatus 10, and displays the abovementioned warning message and abnormality determination status information on a display apparatus connected to this system. An administrator who has confirmed these items of information can, for example, make a determination on this status and notify a connection destination which is registered in advance, and give appropriate advice to a user of the vehicle in which the information processing apparatus 10 is mounted. Of course, the abnormality processing unit 180 may display the abovementioned warning message or abnormality determination status information on a display apparatus in the vehicle in which the information processing apparatus 10 is mounted (for example, an in-vehicle console panel). In this case, it is possible to directly convey these items of information to the user who is operating the vehicle.

The abnormality determination status information described above is, for example as illustrated in FIG. 8 described below, screen information which conceptually represents a status when an abnormality is determined by the abnormality determination unit 130 and which includes an uncorrected reception amount of time prediction range 802 and a corrected reception amount of time prediction range 802', information (X1 and ID 5, and X2 and ID 4) indicating an aperiodic communication communication message determined to have relatedness, and information (M2 and ID 2) indicating a periodic communication communication message which is determined to have relatedness and which should originally be received within the uncorrected reception amount of time prediction range 802. The abnormality processing unit 180 may include the added amount of time 1925 (Δt seconds) in the screen information. As a result, it is possible to grasp by how much the prediction range has deviated, and it is possible to set by how much the prediction range has deviated as a basis for a determination of the cause in a case where an abnormality is determined.

Figure 8:
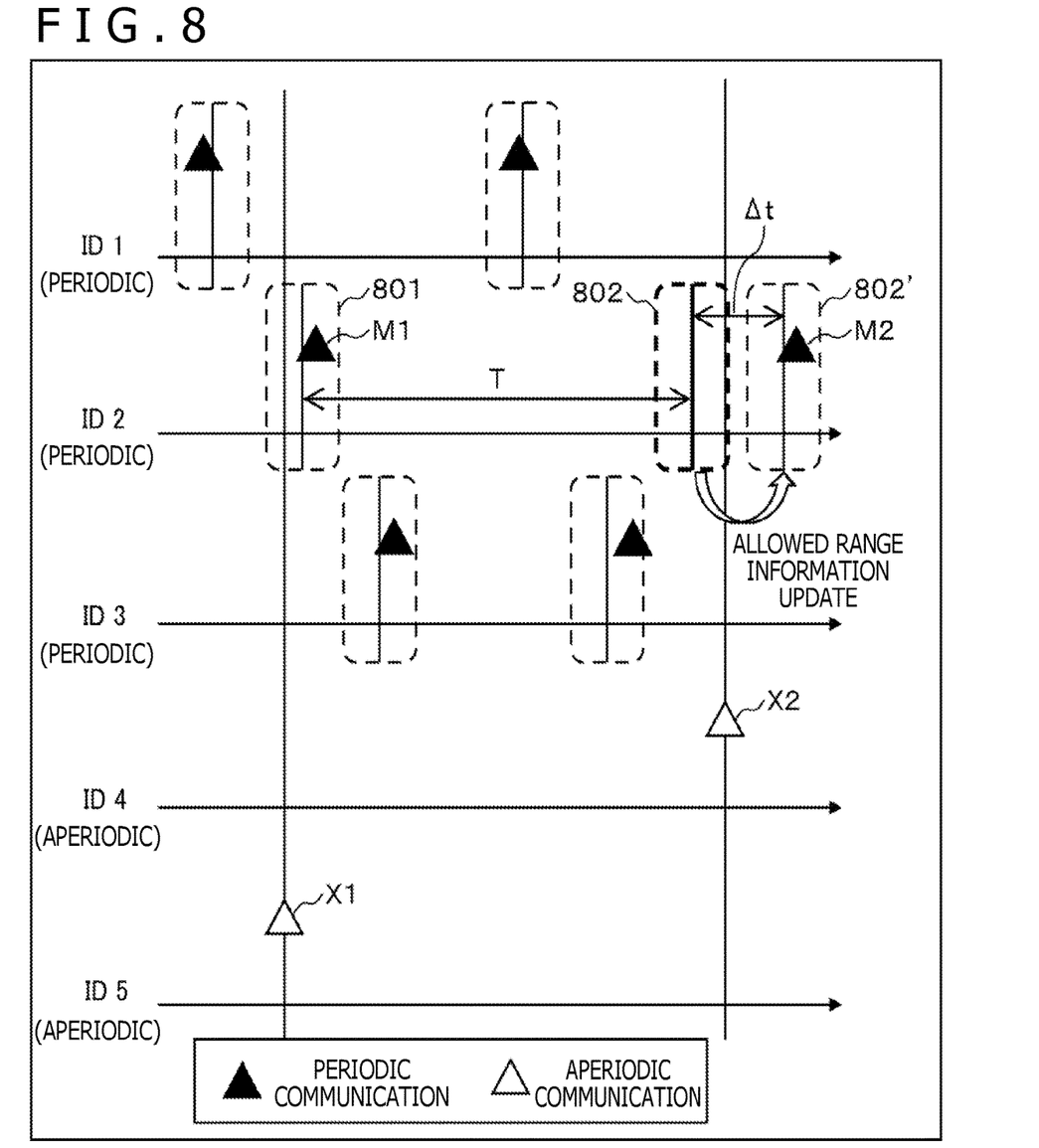
FIG. 8 is a view for describing an overview of an example of a method of detecting legitimate communication using the present embodiment.

In addition, the abnormality processing unit 180 may include, in the screen information, information (M1 and ID 2) indicating a periodic communication communication message which is determined to have relatedness and which has been received within the uncorrected reception amount of time prediction range 801. As a result, it is possible to grasp the temporal position of a periodic communication communication message within the prediction range 801, and it is possible to make the temporal position be a basis for a determination for predicting the possibility that correcting the reception amount of time prediction range will be necessary, periodically after the temporal position.

In a case where a received periodic communication communication message is determined to be an abnormality instead of legitimate communication, information (M2 and ID 2) indicating a periodic communication communication message which is outside the range for the abovementioned allowed range information 802' and which should originally have been received within the uncorrected reception amount of time prediction range 802 is displayed in the abnormality determination status information, or the abovementioned warning message to the effect that periodic communication has been further delayed past the corrected reception amount of time prediction range is displayed without the abovementioned screen information being displayed. In this manner, in a case where a periodic communication second communication message determined to have relatedness by the abnormality determination unit 130 is not within the reception amount of time prediction range 802' which is a predetermined amount of time (added amount of time 1925) later, the abnormality processing unit 180 outputs, to the display unit, the abnormality determination status information which includes the prediction range 802 and the prediction range 802' which is the predetermined amount of time later, information (X1 and ID 5, X2 and ID 4) indicating an aperiodic communication first communication message determined to have relatedness, and information (M2 and ID 2) indicating a second communication message.

Figure 2A:
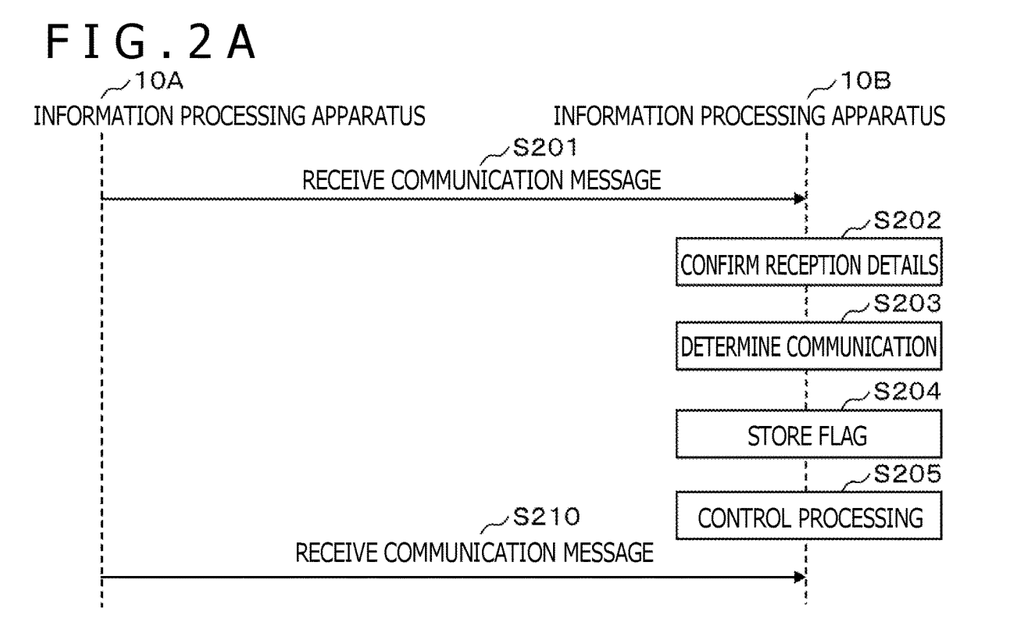
FIG. 2A is a sequence diagram illustrating an outline of an example of processing at a time of reception of aperiodic communication.
Figure 2B:
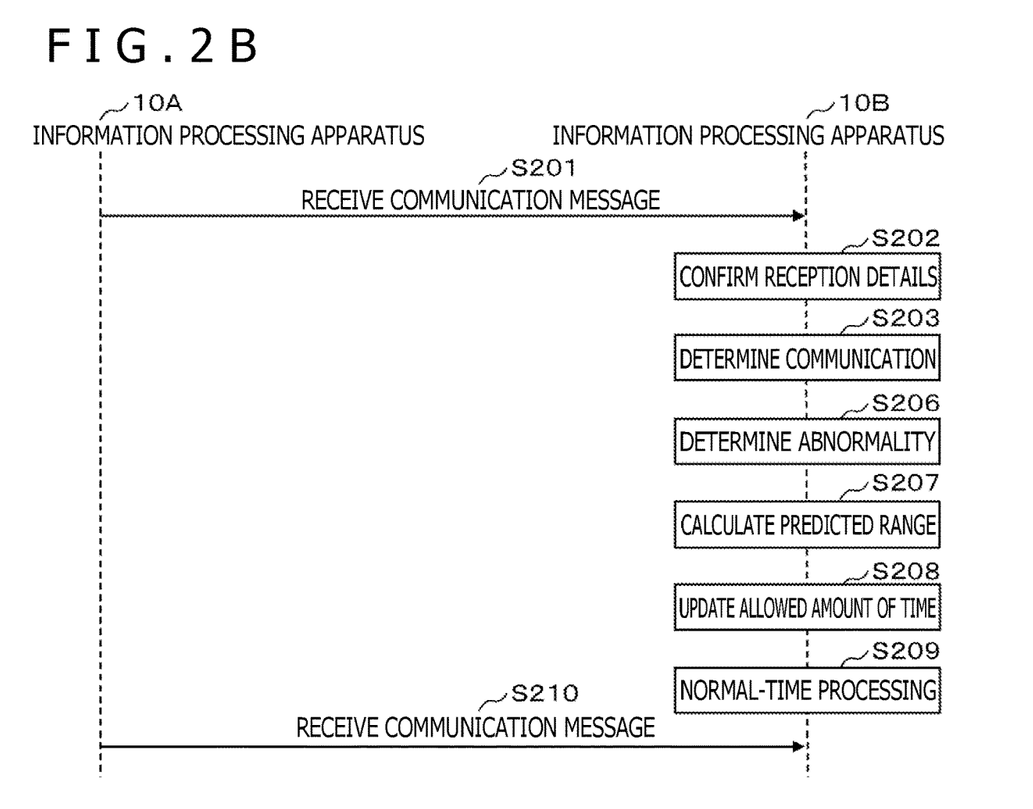
FIG. 2B is a sequence diagram illustrating an outline of an example of processing at a time of reception of periodic communication.

FIGS. 2A and 2B are sequence diagrams for describing a flow of processing for after a communication message is received. An information processing apparatus 10A on a transmitting side and an information processing apparatus 10B on a receiving side each have the system configuration of FIG. 1. In FIGS. 2A and 2B, it is assumed that the information processing apparatus 10A on the transmitting side and the information processing apparatus 10B on the receiving side are ECUs, but application can be similarly performed for another type of apparatus such as a GW, as described above.

FIG. 2A is a sequence diagram for describing an outline of processing for a case in which a communication type of a received communication message is aperiodic communication. The following processing is mainly executed by the information processing apparatus 10B.

Firstly, in step S201, the communication unit 100 of the information processing apparatus 10B receives a communication message transmitted by the information processing apparatus 10A.

In step S202, the information obtainment unit 110 of the information processing apparatus 10B reads a CAN ID from the received communication message, and calculates and records the reception amount of time.

In step S203, the communication determination unit 120 of the information processing apparatus 10B refers to the communication determination information 191 and the read CAN ID of the communication message in order to determine the communication type of the received communication message. In the case where the communication type of the received communication message is aperiodic communication, the communication determination unit 120 of the information processing apparatus 10B transitions to step S204.

In step S204, for each periodic communication CAN ID, the communication determination unit 120 instructs the flag control unit 150 to record that aperiodic communication has been detected in the aperiodic communication detection flag 1932. For example, in a case of setting "1" as the flag for when aperiodic communication is detected, the communication determination unit 120 instructs the flag control unit 150 to update the aperiodic communication detection flag 1932 which is being stored as "0" to "1," and record the CAN ID (for example, 0x05) for the aperiodic communication. According to the instruction, the flag control unit 150 updates the aperiodic communication detection flag 1932 for each periodic communication CAN ID.

In step S205, the normal processing unit 170 of the information processing apparatus 10B performs control processing instructed in the received aperiodic communication communication message.

In step S210, the communication unit 100 of the information processing apparatus 10B receives the next communication message having the same CAN ID as the received communication message.

FIG. 2B is a sequence diagram for describing an outline of processing for a case in which a received communication message is periodic communication, the reception amount of time prediction range for periodic communication is corrected in conjunction with reception of an aperiodic communication communication message which has relatedness, and being legitimate communication is determined. Step S201 through step S203 are similar to the case in FIG. 2A and therefore description thereof is omitted. Description is given for step S206 and thereafter. In the case where the communication type of a communication message is periodic communication, the communication determination unit 120 of the information processing apparatus 10B executes abnormality determination processing in step S206, prediction range calculation processing in step S207, allowed amount of time updating processing in step S208, and normal-time processing in step S209. Detailed processing for these steps is described below using FIG. 3.

In step S206, the abnormality determination unit 130 of the information processing apparatus 10B uses the reception time of the aperiodic communication communication message for which the aperiodic communication detection flag 1932 has been set in step S204 of FIG. 2A and the reception amount of time prediction range for the periodic communication communication message in order to determine whether the aperiodic communication and the periodic communication have relatedness. Furthermore, the abnormality determination unit 130 determines whether the periodic communication communication message determined to have relatedness is within the reception amount of time prediction range, and, in the case of determining that the periodic communication communication message is within the reception amount of time prediction range, determines that the periodic communication communication message is a communication message in accordance with legitimate communication.

In step S207, in a case where the abovementioned periodic communication communication message is determined to be a communication message in accordance with legitimate communication, the allowed range calculation unit 140 of the information processing apparatus 10B calculates the reception amount of time prediction range for the communication message to be received next. In addition, in a case where the abovementioned periodic communication communication message is determined to not be a communication message in accordance with legitimate communication and it is determined that it is possible for a communication message which should be received in the abovementioned prediction range as described below to have arrived late, the allowed range calculation unit 140 corrects the reception amount of time prediction range for the abovementioned periodic communication communication message.

In step S208, the abnormality determination information updating unit 160 of the information processing apparatus 10B updates, on the basis of the prediction range calculated or corrected in step S207, the prediction range used in step S206.

In step S209, in a case where the periodic communication communication message is determined to be a communication message in accordance with legitimate communication, the normal processing unit 170 of the information processing apparatus 10B uses the prediction range which has been calculated or corrected as described above in order to instruct the flag control unit 150 of the information processing apparatus 10B to, regarding the periodic communication determined to be a communication message in accordance with legitimate communication, reset the aperiodic communication detection flag 1932 set in step S204 of FIG. 2A to not detected (for example, "0") and reset the abnormality-time processing flag 1933 from "1" to "0." In addition, the normal processing unit 170 performs, as normal-time processing, control processing which has been instructed in the received periodic communication communication message.

In step S210, the communication unit 100 of the information processing apparatus 10B receives the next communication message having the same CAN ID as the communication message received in step S201.

Figure 3:
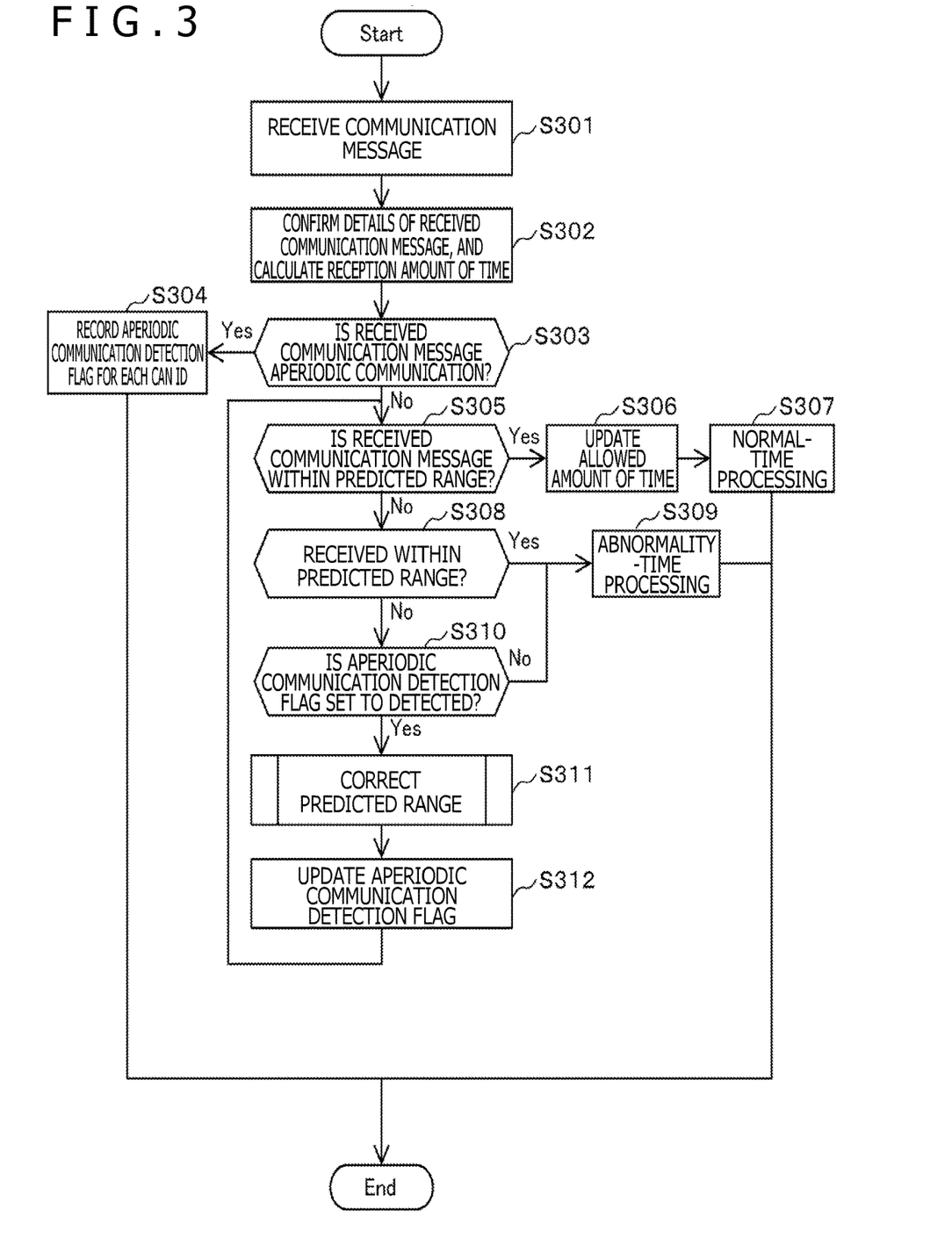
FIG. 3 is a flow chart illustrating an example of a detailed processing procedure for an information processing apparatus in FIG. 2B.

FIG. 3 is a flow chart illustrating an example of a detailed processing procedure for the information processing apparatus 10B in FIG. 2B. As initial processing, in step S301, the communication unit 100 receives a communication message which has been transmitted from the information processing apparatus 10A via the communication bus 2.

In step S302, the information obtainment unit 110 reads identification information (CAN ID) from the received communication message, and calculates a reception amount of time for the communication message. For example, the information obtainment unit 110 calculates the reception amount of time between received communication messages by counting the number of clocks after a communication message is received. The information obtainment unit 110 may calculate the reception amount of time by using a timer to measure the amount of time from when communication starts.

In step S303, the communication determination unit 120 determines, on the basis of the communication determination information 191 and the identification information (CAN ID) included in the received communication message, whether the communication type read by the information obtainment unit 110 is aperiodic communication.

In step S304, in a case where communication determination unit 120 determines that the received communication message is aperiodic communication (S303: Yes), the communication determination unit 120 instructs the flag control unit 150 to record the aperiodic communication detection flag 1932 for each periodic communication CAN ID. According to the instruction, the flag control unit 150 records a flag (for example, "1" indicating detected, and the CAN ID for aperiodic communication) in the aperiodic communication detection flag 1932 for each CAN ID.

The flag detection information 193 holds a flag for each CAN ID 1931 including periodic communication that sets another information processing apparatus 10 (for example, the information processing apparatus 10A in FIG. 2B) as a control target, but it may be that the information processing apparatus 10B stores only the flag detection information 193 for a CAN ID of periodic communication in which the information processing apparatus 10B is defined in advance as a control target. As a result, since only the flag detection information 193 that the information processing apparatus 10 itself controls is stored, it is possible to hold the flag detection information 193 with a small memory capacity.

Furthermore, the abovementioned flag detection information 193 set as a control target may be caused to be stored as follows. For example, after the communication determination unit 120 has determined that a received communication message is aperiodic communication, and similarly to step S305 described below, the abnormality determination unit 130 additionally determines whether the reception time for an aperiodic communication communication message for which the aperiodic communication detection flag 1932 is set is within the periodic communication reception amount of time prediction range calculated by the information obtainment unit 110 in step S302. In a case where the abnormality determination unit 130 determines that the reception time for the abovementioned aperiodic communication communication message is within the abovementioned periodic communication reception amount of time prediction range, the communication determination unit 120 may instruct the flag control unit 150 to set the aperiodic communication detection flag 1932 for the CAN ID of periodic communication determined to be within the abovementioned prediction range. As a result, since the flag detection information 193 is only stored for periodic communication related to aperiodic communication for which the aperiodic communication detection flag 1932 is set, it is possible to have an even smaller memory capacity.

In step S305, processing is performed for the case in which the communication determination unit 120 determined that the received communication message is not aperiodic communication (S303: No), in other words, the case in which the received communication message is determined to be periodic communication. The abnormality determination unit 130 determines whether the reception time of an aperiodic communication communication message, for which the aperiodic communication detection flag 1932 is set, is within a periodic communication reception amount of time prediction range. In a case in which the abnormality determination unit 130 has determined that the reception time of the abovementioned aperiodic communication communication message is within a periodic communication reception amount of time prediction range which is described later, the abnormality determination unit 130 determines that there is relatedness between the aperiodic communication and the periodic communication. Furthermore, the abnormality determination unit 130 determines whether the periodic communication communication message for which having relatedness has been determined is within the abovementioned reception amount of time prediction range. In a case of having determined that the periodic communication communication message for which having relatedness has been determined is within the abovementioned reception amount of time prediction range, the abnormality determination unit 130 determines that the periodic communication communication message is a communication message in accordance with legitimate communication.

In this manner, the abnormality determination unit 130 performs two determinations: a determination regarding the relatedness between aperiodic communication and periodic communication (first determination) and a determination on a periodic communication communication message for which a determination has been made regarding relatedness being in a prediction range (second determination), and determines that the periodic communication communication message is in accordance with legitimate communication.

In step S306, in a case where a periodic communication communication message for which having relatedness between aperiodic communication and periodic communication has been determined is determined to be within the abovementioned reception amount of time prediction range (S305: Yes), the allowed range calculation unit 140 uses the period 1924 to calculate the reception amount of time prediction range for a communication message to be received at a next timing, and the abnormality determination information updating unit 160 updates these values.

For example, in a case where the CAN ID of the received communication message is "0x03," the allowed range calculation unit 140 refers to the abnormality determination information 192 illustrates in FIG. 7A, and reads out the minimum allowed amount of time 1922 "10.11," the maximum allowed amount of time 1923 "10.13," and the period 1924 "0.50" which are stored in association with the CAN ID. The allowed range calculation unit 140 calculates a new minimum allowed amount of time 1922 and maximum allowed amount of time 1923 for the communication message to be received next, which result from respectively adding the period 1924 "0.50" to the minimum allowed amount of time 1922 "10.11" and the maximum allowed amount of time 1923 "10.13." In this case, the abnormality determination information updating unit 160 respectively sets the minimum allowed amount of time 1922 "10.61" and the maximum allowed amount of time 1923 "10.63" as the new allowed amount of time. In this manner, it is possible to define a prediction range for each period because a calculation unit (the allowed range calculation unit 140) calculates the reception amount of time prediction range on the basis of an amount of time in which a second communication message is received (the reception amount of time) and the period 1924.

Subsequently, in step S307, the normal processing unit 170 executes, as normal-time processing, the control processing instructed in the received communication message. In addition, the normal processing unit 170 determines whether the aperiodic communication detection flag 1932 and the abnormality-time processing flag 1933 are in a state of not detected (for example, "0"), and upon determining that these flags are not in a state of not detected, instructs the flag control unit 150 to reset values set for these flags. The flag control unit 150 resets these flags according to the instruction.

In step S308, in the case where it is determined that the periodic communication communication message for which relatedness between aperiodic communication and periodic communication has been determined is not within the abovementioned reception amount of time prediction range (S305: No), because the received periodic communication communication message has the possibility of an abnormality instead of being legitimate communication, the abnormality determination unit 130 further determines whether the reception amount of time of the received periodic communication communication message is an amount of time before the prediction range, in other words whether the reception amount of time is shorter than the minimum allowed amount of time 1922. In a case of determining that the received periodic communication communication message has been received before the prediction range (S308:

Yes), the abnormality determination unit 130 determines that it is not possible for the communication message which should be received in the prediction range to arrive late and that the communication message is an abnormality, and transitions to the abnormality-time processing of step S309.

In step S309, the abnormality processing unit 180 executes, as abnormality-time processing, processing such as discarding the received periodic communication communication message or outputting an alert as described above.

In step S310, in the case of having determined that the received periodic communication communication message is not received before the abovementioned prediction range (S308: No), the abnormality determination unit 130 determines that it is possible that a communication message which should have been received within the abovementioned prediction range has arrived late. In this case, the abnormality determination unit 130 further determines whether the aperiodic communication detection flag 1932 corresponding to the CAN ID of the received periodic communication communication message is set to detected. In a case of determining that the aperiodic communication detection flag 1932 is not set to detected (S310: No), the abnormality determination unit 130 determines that there is an abnormality because a delay has arisen for the periodic communication due to some kind of reason other than aperiodic communication, and executes processing which is similar to that in step S309. Meanwhile, if it is determined in step S310 that the aperiodic communication detection flag 1932 is set to detected (S310: Yes), the abnormality determination unit 130 determines as a result that there is no abnormality, despite the determination that there has been the possibility of an abnormality, and proceeds to step S311.

In step S311, since the aperiodic communication detection flag 1932 is set to detected, the abnormality determination unit 130 determines that it is possible for the communication message which should be received in the abovementioned prediction range to arrive late. On the basis of this determination, the allowed range calculation unit 140 corrects the abovementioned prediction range, and the abnormality determination information updating unit 160 updates the value.

Specifically, the allowed range calculation unit 140 adds the added amount of time 1925 to the minimum allowed amount of time 1922 and the maximum allowed amount of time 1923 to calculate a new corrected minimum allowed amount of time 1922 and maximum allowed amount of time 1923. The abnormality determination information updating unit 160 then updates the uncorrected minimum allowed amount of time 1922 and the maximum allowed amount of time 1923. The added amount of time 1925 is an amount of time which is defined in order to cause the reception amount of time prediction range to shift and slide to a predetermined amount of time later.

In addition to defining the added amount of time 1925 as a predetermined fixed value, the added amount of time 1925 may be defined as a value calculated using a predetermined statistical method. For example, the allowed range calculation unit 140 may, in advance, calculate and set as the added amount of time 1925 an average of actual reception times when periodic communication communication messages have been received in the past within a corrected reception amount of time prediction range. Alternatively, the allowed range calculation unit 140 may define the added amount of time 1925 according to the number of aperiodic communication communication messages identified by a CAN ID which is prioritized ahead of periodic communication. It is considered that the greater the number of these aperiodic communication communication messages identified by a CAN ID which is prioritized, the higher the possibility of periodic communication communication message being delayed. Accordingly, the allowed range calculation unit 140 sets a longer added amount of time 1925 the greater the number of these aperiodic communication communication messages within a predetermined time period. In this manner, since the allowed range calculation unit 140 and the abnormality determination information updating unit 160 (correction unit) perform correction by adding a predetermined value or a value calculated using a predetermined statistical method to the reception amount of time prediction range, by using various methods, it is possible to define the added amount of time by an optimal method according to the environment in which an information processing apparatus 10 is installed.

Figure 4:
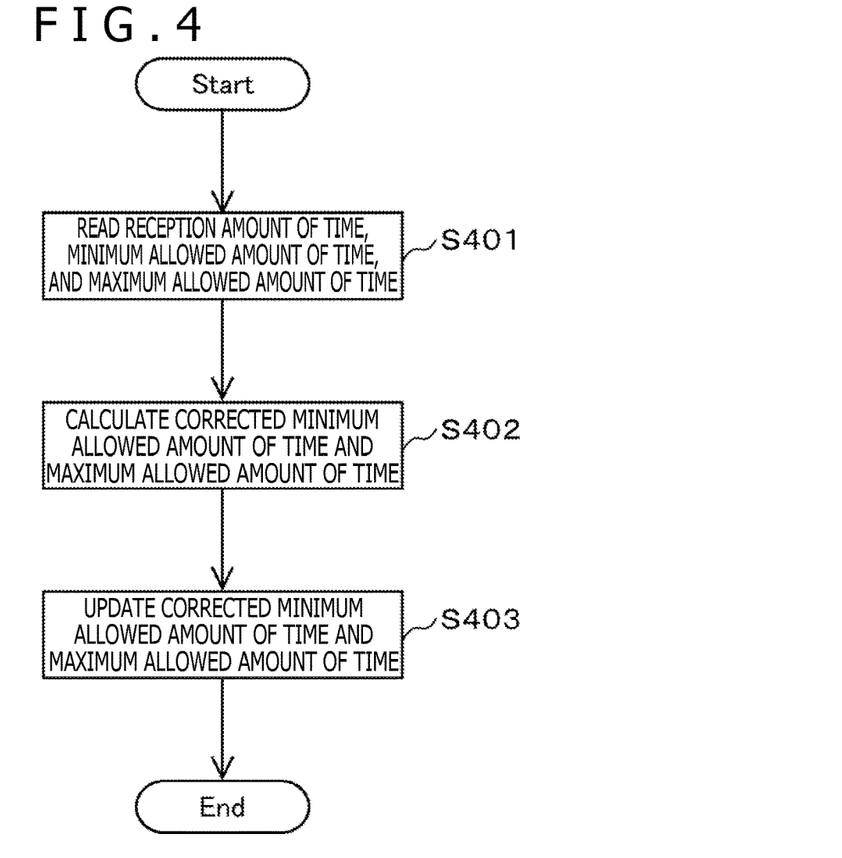
FIG. 4 is a flow chart illustrating an example of a processing procedure for processing (step S311) for using an added amount of time to correct a prediction range.

FIG. 4 is a flow chart illustrating a processing procedure for processing (step S311) for using an added amount of time to correct the prediction range.

In step S401, the allowed range calculation unit 140 reads the reception amount of time of the periodic communication communication message which is calculated by the information obtainment unit 110, and the minimum allowed amount of time 1922 and the maximum allowed amount of time 1923 which are stored in the abnormality determination information 192.

In step S402, the allowed range calculation unit 140 uses the added amount of time 1925 of the abnormality determination information 192 to correct the minimum allowed amount of time 1922 and the maximum allowed amount of time 1923 by the method described above.

In step S403, the abnormality determination information updating unit 160 updates the minimum allowed amount of time 1922 and the maximum allowed amount of time 1923 to the corrected values. For example, as illustrated in FIG. 7B, regarding periodic communication for which the CAN ID is "0x03," the added amount of time "0.05" is added to each of the uncorrected minimum allowed amount of time "10.11" and maximum allowed amount of time "10.13" indicated in FIG. 7A, and these are updated to the corrected minimum allowed amount of time "10.16" and maximum allowed amount of time "10.18."

In this manner, in a case where a second communication message which is periodic communication determined to have relatedness by the abnormality determination unit 130 is not in the reception amount of time prediction range, the allowed range calculation unit 140 and the abnormality determination information updating unit 160 (correction unit) correct the prediction range to be a prediction range which is a predetermined amount of time (the added amount of time 1925) later. As a result, the abnormality determination unit 130 can perform the abovementioned second determination on the basis of the corrected new prediction range.

Returning to FIG. 3, in step S312, the abnormality determination information updating unit 160 instructs the flag control unit 150 to reset the aperiodic communication detection flag 1932 stored in association with the CAN ID of periodic communication for which the prediction range has been corrected to not detected (for example, "0"), but set the abnormality-time processing flag 1933 to have processing (for example, "1"). In accordance with this instruction, the flag control unit 150 updates the aperiodic communication detection flag 1932 and the abnormality-time processing flag 1933.

Subsequently, returning to step S305 again, the abnormality determination unit 130 uses the corrected reception amount of time prediction range to perform the second determination described above. In the first determination performed in the previous step S305, the abnormality determination unit 130 determined that there is relatedness with the aperiodic communication identified by the aperiodic communication detection flag 1932 which has been reset in step S312, and thus here does not perform the first determination described above.

In a case of determining in the second determination that the periodic communication communication message is within the abovementioned corrected reception amount of time prediction range, the abnormality determination unit 130 determines that the periodic communication communication message is a communication message in accordance with legitimate communication which should originally have been received in the uncorrected prediction range, and determines that the communication message is in accordance with legitimate communication.

In the case where the abnormality determination unit 130 has determined in the abovementioned second determination that the communication message is in accordance with legitimate communication (S305 again: Yes), in step S306, the allowed range calculation unit 140 performs similar processing to that in the previous step S306 with respect to the corrected minimum allowed amount of time 1922 and maximum allowed amount of time 1923. Specifically, the allowed range calculation unit 140 calculates a new minimum allowed amount of time 192 and maximum allowed amount of time 1923 for the communication message to be received at the next period which result from adding the period 1924 to the corrected minimum allowed amount of time 1922 and the maximum allowed amount of time 1923, and the abnormality determination information updating unit 160 updates to these values. Subsequently, the normal processing unit 170 executes processing which is similar processing to that of the previous step S307.

Meanwhile, in a case of determining in the second determination described above that the communication message is not in accordance with legitimate communication (S305 again: No), in step S308, the abnormality determination unit 130 determines whether the reception amount of time of the received periodic communication communication message is an amount of time which is before the corrected prediction range. In a case of determining that the received periodic communication communication message is an amount of time before the corrected prediction range (S308: Yes), the abnormality determination unit 130 proceeds to step S310.

In step S310, the abnormality determination unit 130 determines whether the aperiodic communication detection flag 1932 is set to detected. Since step S311 has been executed in processing of the previous time, at this time the aperiodic communication detection flag 1932 is reset to not detected. Accordingly, in the processing of the present time, the abnormality determination unit 130 proceeds to step S309 without proceeding to step S311 again, and transitions to abnormality-time processing.

Note that, in step S309, since it is possible to determine according to the abnormality-time processing flag 1933 whether the prediction range has been corrected, processing such as the following may be executed.

For example, in a case where the abnormality determination unit 130 determines whether the abnormality-time processing flag 1933 (for example, "1") is set and determines that the abnormality-time processing flag 1933 is set, in step S309, because the abnormality-time processing has been executed in the past, the abnormality processing unit 180 executes processing by changing the processing content for the current time. For example, it may be that the abnormality processing unit 180 uses the corrected prediction range to determine whether there is still an abnormality, and instead of discarding the communication message, outputs a warning message indicating an alert or abnormality determination status information as described above.

Next, description is given for an overview described in the present embodiment, with reference to FIG. 8. FIG. 8 is a view for describing an overview of a method of determining legitimate communication using the present embodiment. In FIG. 8, the information obtainment unit 110 calculates a reception amount of time for each periodic communication communication message (ID 1, ID 2, ID 3) received by the communication unit 100. For example, the information obtainment unit 110 calculates a reception amount of time of a communication message M1 with ID 2 received within the prediction range 801. In addition, in FIG. 8, since an aperiodic communication communication message X1 with ID 5 is received, the communication determination unit 120 sets, with respect to the flag control unit 150, the aperiodic communication detection flag 1932 (for example, "1" (ID 5)) corresponding to periodic communication for each of ID 1, ID 2, and ID 3.

The abnormality determination unit 130 determines that there is relatedness between aperiodic communication (ID 5, X1) and periodic communication (ID 2), and that the periodic communication communication message (M1) determined to have relatedness is within the reception amount of time prediction range 801. Since the periodic communication communication message (ID 2, M1) is a communication message in accordance with legitimate communication, the allowed range calculation unit 140 calculates the reception amount of time prediction range 802 of the communication message which is to be received at the next timing which is a period T (sec) later. Since it is determined that the periodic communication communication message (ID 2, M1) is a communication message in accordance with legitimate communication, the aperiodic communication detection flag 1932 and the abnormality-time processing flag 1933 are reset to not detected (for example, "0"), and normal-time processing is executed.

Furthermore, in FIG. 8, since an aperiodic communication communication message X2 with ID 4 is received, the communication determination unit 120 sets, with respect to the flag control unit 150, the aperiodic communication detection flag 1932 (for example, "1" (ID 4)) corresponding to periodic communication for each of ID 1, ID 2, and ID 3.

The abnormality determination unit 130 determines that there is relatedness between aperiodic communication (ID 4, X2) and periodic communication (ID 2), and that the periodic communication communication message (M2) determined to have relatedness is not within the reception amount of time prediction range 802. Furthermore, the abnormality determination unit 130 determines that the abovementioned periodic communication communication message (M2) is not received before the prediction range 802, and the aperiodic communication detection flag 1932 corresponding to the CAN ID of this communication message is set to detected. The abnormality determination unit 130 determines that it is possible for the communication message M2 which should be received in prediction range 802 to have arrived late, and, on the basis of this determination, the allowed range calculation unit 140 calculates the new corrected prediction range 802' resulting from adding Δt which is the added amount of time 1925 to the prediction range 802, and the flag control unit 150 resets the aperiodic communication detection flag 1932 to not detected.

Subsequently, the abnormality determination unit 130 determines that the periodic communication communication message (M2) determined to have relatedness with the aperiodic communication (ID 4, X2) and periodic communication (ID 2) is within the abovementioned reception amount of time prediction range 802'. The abnormality determination unit 130 determines that this periodic communication communication message (M2) is the communication message (M2) in accordance with legitimate communication which originally should have been received in the prediction range 802 but arrived late due to the aperiodic communication (ID 4, X2) determined to have relatedness. The allowed range calculation unit 140 then calculates a new prediction range which is for reception to be performed at the next period and which results from adding the period T to the corrected prediction range 802'.

Since it is determined that the periodic communication communication message (ID 2, M2) is a communication message in accordance with legitimate communication, similarly to the case of the periodic communication communication message (ID 2, M1) described above, the aperiodic communication detection flag 1932 and the abnormality-time processing flag 1933 are reset to not detected, and normal-time processing is executed. Meanwhile, in a case where the abnormality determination unit 130 determines that the periodic communication communication message (M2) for which having relatedness is determined is not within the new corrected prediction range 802', abnormality-time processing is executed. Note that, in the present embodiment, the new prediction range 802' is set by taking the most recent prediction range 802 as a reference, but a new prediction range 802' may be calculated by using a previous prediction range (for example, the prediction range 801) and the period 1924.

As described thus far, by virtue of the present embodiment, in an information processing apparatus capable of aperiodic communication and periodic communication, a communication determination unit (the communication determination unit 120) determines the type of a communication message, a first processing determination unit (the abnormality determination unit 130) determines relatedness between the aperiodic communication and the periodic communication using a first communication message for which the type is determined to be aperiodic communication and a prediction range for an amount of time (the reception amount of time) for receiving a second communication message for which the type is determined to be periodic communication, and a second processing determination unit (the abnormality determination unit 130) determines that the second communication message is legitimate communication for periodic communication in a case where the periodic communication second communication message for which having relatedness is determined is in the prediction range a predetermined amount of time (the added amount of time 1925) later. Accordingly, it is possible to correctly determine that a delayed communication message is legitimate communication for periodic communication, and, as a result of this determination, it is possible to correctly detect periodic communication as legitimate communication. Furthermore, by correctly detecting legitimate communication, it is possible to reduce the impact of misdetecting that a communication message is an attack on travel control with respect to an automobile.

In addition, with the method of Patent Document 1 which counts the number of communication messages, since, for each CAN ID, a count value resulting from counting the number of communication messages is compared with a predicted value for this count value each monitor period, RAM capacity needed increases. In an in-vehicle system, since there is a need to have as low a RAM capacity as possible with respect to something for which low resources is desired such as an ECU or GW, it is considered that it may be difficult to satisfy this need in a case where this method is employed.

However, by virtue of the present embodiment, the communication determination unit 120 stores flag information (the aperiodic communication detection flag 1932) indicating that the first communication message has been received in a storage unit (related information storage unit 190) for periodic communication that sets the information processing apparatus 10 as a control target, and a first processing determination unit (the abnormality determination unit 130) uses this flag information to determine relatedness between aperiodic communication and periodic communication. Furthermore, the communication determination unit 120 stores the flag information for, from among periodic communication that sets the information processing apparatus 10 as a control target, periodic communication for which having relatedness has been determined by the abovementioned first processing determination unit. Accordingly, since it is possible to determine legitimate communication by using a flag that takes two values—"1" or "0"—instead of counting the number of communication messages, it is possible to suppress RAM capacity that is needed.

Furthermore, for example, in the case where a deviation arises for the number of counted messages due to some kind of cause including a physical factor such as an abnormality in RAM that holds the number of counted communication messages, with the abovementioned method of Patent Document 1 it is not possible to correctly determine legitimate communication, and misdetection as an attack will occur. However, by virtue of the present embodiment, since legitimate communication is determined using a flag which takes two values as described above, a deviation in the number of messages ceases to occur, and it is possible to improve the accuracy of detecting an attack.

While the above disclosure has been described using a representative embodiment, a person skilled in the art would understand that various changes or modifications in form and detail can be made without departing from the spirit or the scope of the disclosed subject matter.

REFERENCE SIGNS LIST

2: Communication bus
10: Information processing apparatus
100: Communication unit
110: Information obtainment unit
120: Communication determination unit
130: Abnormality determination unit
140: Allowed range calculation unit
150: Flag control unit
160: Abnormality determination information updating unit
170: Normal processing unit
180: Abnormality processing unit
190: Related information storage unit
191: Communication determination information
192: Abnormality determination information
193: Flag detection information

The invention claimed is:

1. An information processing apparatus capable of aperiodic communication and periodic communication, comprising:

a processor coupled to a memory storing instructions to permit the processor to function as:

a communication determination unit that determines a type of a communication message based on a table that stores communication determination information;

a first processing determination unit that determines relatedness between aperiodic communication and periodic communication by using a first communication message for which the type is determined to be aperiodic communication, a second communication message for which the type is determined to be periodic communication, and a prediction range for an amount of time for receiving the second communication message; and a second processing determination unit that determines that the second communication message is legitimate communication for periodic communication in a case where the second communication message determined to have relatedness is in the prediction range after a predetermined time, wherein the prediction range is calculated on a basis of the amount of time for receiving the second communication message.

2. The information processing apparatus according to claim 1, wherein the processor further functions as:

a correction unit that, in a case where the second communication message determined to have relatedness is not in the prediction range, corrects the prediction range to the prediction range that is after the predetermined time.

3. The information processing apparatus according to claim 2, wherein the correction unit performs the correction by adding to a prediction range predetermined value or a value calculated by using a predetermined statistical method.

4. The information processing apparatus according to claim 1, wherein the processor further functions as:

a calculation unit that calculates the prediction range on the basis of the amount of time for receiving the second communication message, and a period at which the second communication message is received.

5. The information processing apparatus according to claim 1, wherein the communication determination unit, for periodic communication for which the information processing apparatus is a control target, stores in a storage unit flag information indicating that the first communication message has been received, and the first processing determination unit uses the flag information to determine the relatedness between aperiodic communication and periodic communication.

6. The information processing apparatus according to claim 5, wherein the communication determination unit stores the flag information for, from among periodic communication that sets the information processing apparatus as a control target, periodic communication for which having relatedness has been determined by the first processing determination unit.

7. The information processing apparatus according to claim 1, wherein the processor further functions as:

an abnormality processing unit that, in a case where the second communication message determined to have relatedness is not within the prediction range after the predetermined time, outputs to a display unit abnormality determination status information which includes the prediction range and the prediction range after the predetermined time, information indicating the first communication message determined to have relatedness, and information indicating the second communication message.

8. A legitimate communication determination method performed by an information processing apparatus capable of aperiodic communication and periodic communication, the method comprising:

determining a type of a communication message based on a table that stores communication determination information;

determining relatedness between aperiodic communication and periodic communication by using a first communication message for which the type is determined to be aperiodic communication, a second communication message for which the type is determined to be periodic communication, and a prediction range for an amount of time for receiving the second communication message; and determining that the second communication message is legitimate communication for periodic communication in a case where the second communication message determined to have relatedness is in the prediction range after a predetermined time, wherein the prediction range is calculated on a basis of the amount of time for receiving the second communication message.

* * * * *